(12) United States Patent
Sonnekalb et al.

(10) Patent No.: US 11,002,471 B2
(45) Date of Patent: May 11, 2021

(54) REFRIGERATION INSTALLATION, REFRIGERATION INSTALLATION SYSTEM AND METHOD WITH REFRIGERANT DISPLACEMENT

(71) Applicant: KONVEKTA AG, Schwalmstadt (DE)

(72) Inventors: Michael Sonnekalb, Schwalmstadt (DE); Sebastian Fink, Willingshausen (DE); Philipp Merle, Willingshausen (DE)

(73) Assignee: KONVEKTA AG, Schwalmstadt (DE)

( * ) Notice: Subject to any disclaimer, the term of this patent is extended or adjusted under 35 U.S.C. 154(b) by 137 days.

(21) Appl. No.: 16/307,310

(22) PCT Filed: May 31, 2017

(86) PCT No.: PCT/DE2017/100465
§ 371 (c)(1),
(2) Date: Mar. 28, 2019

(87) PCT Pub. No.: WO2017/211351
PCT Pub. Date: Dec. 14, 2017

(65) Prior Publication Data
US 2019/0219315 A1 Jul. 18, 2019

(30) Foreign Application Priority Data
Jun. 6, 2016 (DE) .......................... 102016110443.4

(51) Int. Cl.
*F25B 49/00* (2006.01)
*F25B 6/02* (2006.01)
(Continued)

(52) U.S. Cl.
CPC ....... *F25B 49/005* (2013.01); *B60H 1/00914* (2013.01); *F25B 6/02* (2013.01);
(Continued)

(58) Field of Classification Search
CPC .. F25B 6/02; F25B 6/04; F25B 41/003; F25B 41/04; F25B 49/005; F25B 2500/07;
(Continued)

(56) References Cited

U.S. PATENT DOCUMENTS

2009/0095005 A1* 4/2009 Dietrich ................. F25B 41/04
62/244
2009/0320504 A1 12/2009 Gupte

FOREIGN PATENT DOCUMENTS

DE 102007043161 A1 * 3/2008 ......... B60H 1/00921
DE 102007043162 A1 3/2008
(Continued)

*Primary Examiner* — Marc E Norman
(74) *Attorney, Agent, or Firm* — Brian K. Yost; Decker Jones, PC

(57) ABSTRACT

The invention relates to a refrigeration installation (1), to a method for same, and to a refrigeration installation system for controlling the temperature of air, including at least one compressor (3), at least one expansion element (39), and at least one first (5) and a second (7) heat exchanger, each of which can be operated as a condenser or a gas cooler, wherein at least one of the heat exchangers can be operated as an evaporator or at least one additional heat exchanger is provided which can be operated as an evaporator. A refrigerant line is equipped with a first valve (11) downstream of at least one compressor (3) at or downstream of a branch (9) and upstream of or at the condenser or gas cooler inlet (15) of the first heat exchanger (5), and a second valve (19) is arranged at or downstream of the condenser or gas cooler outlet (17) of the first heat exchanger (5) and upstream of or as an expansion element. The refrigeration installation (1) contains at least one valve controller (13) for the first (11) and second valve (19) with at least one first and second possible valve set-up in order to displace the refrigerant, wherein the first valve (11) is open while the second valve (19) is closed at the same time in the first set-up and vice
(Continued)

Figure 1A:
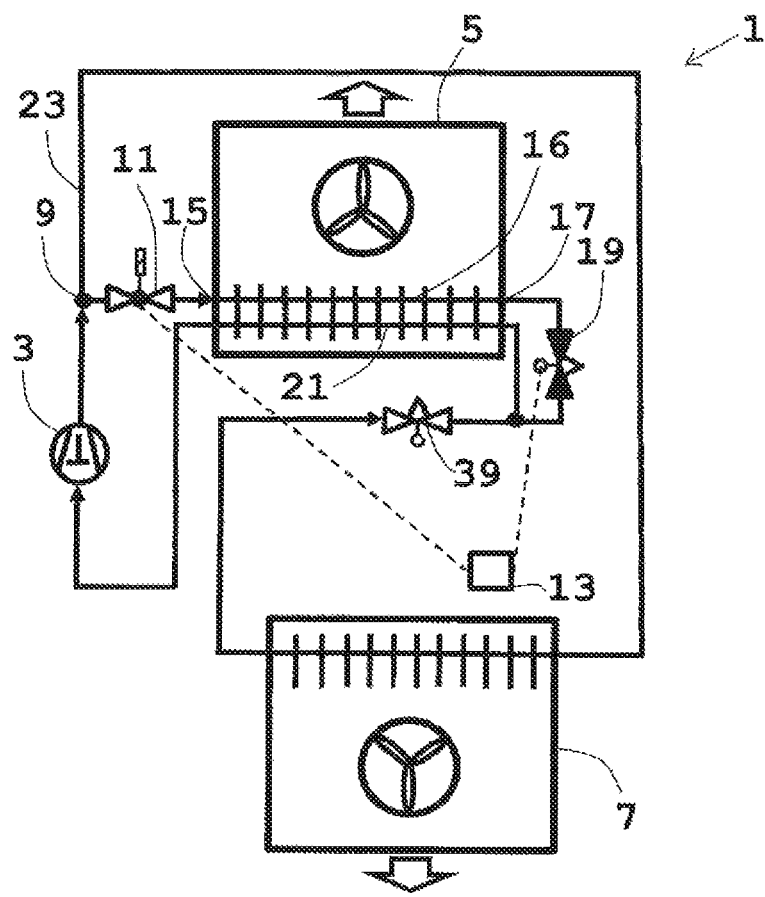

versa in the second set-up. The valve controller (13) comprises an automatic regulator which sets the first valve switch set-up for at least one heat exchanger (5, 7) which is not being used as a with refrigerant flowing through condenser or gas cooler at the moment when a specified refrigerant quantity is exceeded in the refrigerant circuit through which refrigerant is flowing.

31 Claims, 8 Drawing Sheets

(51) Int. Cl.
| | | |
|---|---|---|
| *F25B 6/04* | (2006.01) | |
| *F25B 9/00* | (2006.01) | |
| *B60H 1/00* | (2006.01) | |
| *F25B 41/20* | (2021.01) | |
| *F25B 41/40* | (2021.01) | |

(52) U.S. Cl.
CPC ............... *F25B 6/04* (2013.01); *F25B 9/002* (2013.01); *F25B 41/20* (2021.01); *F25B 41/40* (2021.01); *B60H 2001/00942* (2013.01); *F25B 2400/0403* (2013.01); *F25B 2500/29* (2013.01); *F25B 2500/31* (2013.01); *F25B 2600/2501* (2013.01); *F25B 2600/2503* (2013.01); *F25B 2600/2519* (2013.01)

(58) Field of Classification Search
CPC .............. F25B 2500/23; F25B 2500/24; F25B 2600/2501; F25B 2600/2519; B60H 1/00914
See application file for complete search history.

(56) References Cited

FOREIGN PATENT DOCUMENTS

| | | | |
|---|---|---|---|
| DE | 102008028178 A1 * | 12/2009 | ............. F25B 40/00 |
| DE | 102008047753 A1 | 3/2010 | |
| DE | 102011118162 A1 | 5/2013 | |
| DE | 102014203895 A1 | 9/2015 | |
| DE | 102015007565 B3 | 11/2016 | |
| EP | 2623878 A2 | 8/2013 | |
| JP | 2003121019 A | 4/2003 | |

* cited by examiner

REFRIGERATION INSTALLATION, REFRIGERATION INSTALLATION SYSTEM AND METHOD WITH REFRIGERANT DISPLACEMENT

FIELD OF TECHNOLOGY

The invention relates to a refrigeration installation for controlling the temperature of the air with at least one compressor, at least one expansion element and at least one first and one second heat exchanger, each of which can be operated as a condenser or gas cooler, and at least one heat exchanger or another heat exchanger that can be operated as an evaporator, wherein in the refrigerant line a first valve is provided behind at least one compressor at or behind a junction and in front of or at the condenser or gas cooler inlet of the first heat exchanger and wherein a second valve is provided at or behind the condenser or gas cooler outlet of the first heat exchanger and in front of or as an expansion element, wherein the refrigeration installation also contains at least one valve controller for the first and second valves for refrigerant displacement with at least a first and a second valve set-up, firstly with an open first valve and at the same time a closed second valve or secondly with a closed first valve and at the same time an open second valve. The invention also relates to a refrigeration installation system with a refrigeration installation of the prior art and a method for refrigerant displacement for refrigeration installations and refrigeration installation systems of the prior art.

A heat exchanger that can be operated as a condenser or gas cooler is a heat exchanger that, according to its construction, is suitable to be used in a refrigeration installation as a condenser or gas cooler.

A junction is a site in the refrigerant line in which it branches.

STATE-OF-THE-ART

Refrigeration installations with at least two heat exchangers that can be operated as a condenser or gas cooler are not unusual in larger vehicles with various air conditioning zones, such as in some buses or some railway vehicles or when air conditioning areas. Heat exchangers that can be operated both as a condenser or gas cooler and as an evaporator are also not unusual. Thus, a refrigeration installation with two such switchable heat exchangers is described, for example, in DE 10 2014 203 895 A1.

In a heat exchanger operated as a gas cooler, the refrigerant, e.g. $CO_2$, does not liquefy upon cooling down in the heat exchanger. It is operated in the transcritical area.

When operating refrigeration installations, it is known that there is the problem that the pressure in the high-pressure area of the refrigerant circulation becomes too high, for example, in elevated ambient temperatures or it becomes too low for example in low ambient temperatures. In high ambient temperatures, many refrigeration installations discharge refrigerant, as is known, which can, however, lead to vapor bubbles upon entering the expansion element and reduces the refrigerating capacity.

Vehicle air conditioner installations are known, for example, in which a maximum pressure governor switches off the installation when the pressure in the high-pressure area is too high and thus the passenger area is no longer cooled.

In DE 10 2007 043 162 A1, a refrigeration installation referred to there as an air conditioner is disclosed, in which an overcurrent valve is provided in the refrigerant circulation between the condenser outlet and the expansion element inlet, whose overcurrent valve is automatically opened independently of the operational pressure and allows refrigerant to circulate from the high-pressure side into a container on the low-pressure side so that this refrigerant is temporarily extracted from the refrigerant circulation consisting of the compressor, the condenser, the expansion element and the evaporator. However, it is disadvantageous here that an additional container is necessary in addition to the heat exchangers, which means, in particular, additional material with corresponding costs and additional space usage and more weight.

In US 2009/0320504 A1 and in DE 10 2008 047 753 A1, a refrigeration installation with at least one compressor, at least one expansion element and at least one first and one second heat exchanger, each of which can be operated as a condenser, and a heat exchanger that can be operated as an evaporator is disclosed, wherein a first valve is provided in the refrigerant line behind at least one compressor at or behind a junction and in front of or at the condenser inlet of the first heat exchanger and wherein a second valve is provided at or behind the condenser outlet of the first heat exchanger and in front of or as an expansion element. Yet neither in US 2009/0320504 A1 nor in DE 10 2008 047 753 A1 is a solution disclosed for the problems with excess pressure on the one hand and low pressure in the high-pressure area on the other hand or of too little or too much refrigerant in the refrigerant circuit currently in operation, but a solution is disclosed in US 2009/0320504 for defrosting the evaporator and in DE 10 2008 047 753 A1 a solution is presented for controlling the temperature of multiple areas to be cooled to varying usage temperatures, wherein the lowest usage temperature can be maintained even when the vehicle is stopped and the engine switched off.

Both in DE 10 2011 118 162 A1 and in DE 10 2015 007 565 B3, which was not published until Nov. 17, 2016 and thus after the priority date, a refrigeration installation with at least one compressor, at least one expansion element and at least a first and a second heat exchanger, each of which can be operated as a condenser, and a heat exchanger that can be operated as an evaporator is disclosed, wherein a first valve is provided in the refrigerant line behind at least one compressor at or behind a junction and in front of a condenser inlet of the first heat exchanger and wherein a second valve is provided behind the condenser outlet of the first heat exchanger as an expansion element. Furthermore, both DE 10 2011 118 162 A1 and in DE 10 2015 007 565 B3 disclose a refrigerant displacement of refrigerant into and a retrieval from the first heat exchanger which is hot currently operating as a with refrigerant flowing through condenser or gas cooler. However, it is disadvantageous that the refrigeration installation disclosed in DE 10 2011 118 162 A1 also necessarily contains an internal heat exchanger as well as specifically a bypass to the refrigerant circulation of the high-pressure passage of the internal heat exchanger provided between the high-pressure outlet of the internal heat exchanger and the condenser area of the first heat exchanger, whose bypass can be closed off. This refrigeration installation disclosed here additionally with an internal heat exchange and said bypass and the additionally disclosed refrigerant displacement regulator are thus expensive, complicated and cumbersome. Although no bypass is disclosed as necessary in the system shown in DE 10 2015 007 565 B3, an internal heat exchanger as well as a paging line designed as a capillary line are additionally disclosed as essential required features of the installation there. The refrigeration installation disclosed there additionally with an internal heat exchanger and the paging line designed as a capillary line and the regulation of the refrigerant displacement disclosed for this purpose are thus expensive, complicated and cumbersome.

JP 2003 121019 A discloses a refrigeration installation with a compressor, a single expansion element and a first and a second heat exchanger, each of which can be operated as a condenser, and a further heat exchanger that can be operated as an evaporator, wherein in the refrigerant line a first valve is provided behind the compressor, behind a junction and in front of the condenser inlet of the first heat exchanger and wherein a second valve is provided behind the condenser outlet of the first heat exchanger and in front of the expansion element. Furthermore, in JP 2003 121019 A, among other things, a valve set-up with an open first valve and at the same time a closed second valve is described for the refrigeration installation disclosed there. Concerning the refrigeration installation disclosed in JP 2003 121019 A, a valve set-up in the valve controller for refrigerant displacement through extraction and thus emptying of refrigerant from the first heat exchanger which is not currently operating as a with refrigerant flowing through condenser is not disclosed.

The invention is thus based on the first task of providing an improved refrigeration installation with the possibility of distributing refrigerant, comprising at least one refrigerant circuit with at least one compressor, at least one expansion element and at least one heat exchanger that can be operated as a condenser or gas cooler and at least one heat exchanger or another heat exchanger that can be operated as an evaporator. A corresponding second task is the provision of an improved refrigeration installation system with an improved refrigeration installation according to the first task. Moreover, a third task is to provide a method for refrigerant displacement with such an improved refrigeration installation.

SUMMARY OF THE INVENTION

The first task is fulfilled by a refrigeration installation according to the features of claim 1. The first task is thus fulfilled by a refrigeration installation for controlling the temperature of the air with at least one compressor, at least one expansion element and at least one first and one second heat exchanger, each of which can be operated as a condenser or gas cooler, and at least one heat exchanger or another heat exchanger that can be operated as an evaporator, wherein in the refrigerant line a first valve is provided behind at least one compressor at or behind a junction and in front of or at the condenser or gas cooler inlet of the first heat exchanger and wherein a second valve is provided at or behind the condenser or gas cooler outlet of the first heat exchanger and in front of or as an expansion element, wherein the refrigeration installation also contains at least one valve controller for the first and second valves for refrigerant displacement with at least a first and a second valve set-up, firstly with an open first valve and at the same time a closed second valve or secondly with a closed first valve and at the same time an open second valve and wherein the valve controller comprises the automatic regulator that is designed to activate the first valve set-up, upon exceeding a predetermined amount of refrigerant in the refrigerant circuit and/or upon exceeding a predetermined refrigerant pressure behind the compressor in the refrigerant circuit, for at least one heat exchanger which is not currently operating as a with refrigerant flowing through condenser or gas cooler. A condenser or gas cooler area of a heat exchanger can thus be used, without an additional reservoir, to collect refrigerant and also release refrigerant as needed into the refrigerant circulation currently in operation. Thus, refrigerant in the condenser or gas cooler area of the at least one heat exchanger with refrigerant not currently circulating through it can be automatically collected and extracted from the currently circulating refrigerant course and thus reduce the amount of refrigerant and/or pressure there.

This possibility for refrigerant displacement saves on costs, material, weight and space for a reservoir often otherwise additionally necessary for refrigerant displacement. A condenser or gas cooler area of a heat exchanger of the apparatus according to the invention not currently operated for refrigerant refrigeration can thus be used in a simple and meaningful way without great effort.

Advantageous embodiments, updated versions and improvements of the respective object of the invention are stated in the dependent claims.

According to an advantageous updated version of the refrigeration installation according to the invention, a third valve is provided in the refrigerant line at or behind the junction in the branching area and in front of or at the condenser or gas cooler inlet of the second heat exchanger and a fourth valve is provided at or behind the condenser or gas cooler outlet of the second heat exchanger and in front of or as an expansion element, wherein the refrigeration installation contains the valve controller for the third and fourth valves with at least a first and a second valve set-up, firstly with an open third valve and at the same time a closed fourth valve or secondly with a closed third valve and at the same time an open fourth valve. Thus, a condenser or gas cooler area of the second heat exchanger can be used for refrigerant displacement. refrigerant displacement can then also take place alternatively in the condenser or gas cooler area of the respectively other heat exchanger depending on which of the two heat exchangers is currently being used to cool the refrigerant. In such an updated version, the first and third valves are preferably designed together as a single three-way valve. This saves on costs, material, weight and space.

According to an advantageous embodiment of the refrigeration installation according to the invention, the valve controller for the first and second valves and/or for the third and fourth valves comprises a third valve set-up with an open first and at the same time a third second valve or an open third and at the same time an open fourth valve. Thus, the condenser or gas cooler area can also easily be operated to cool the circulating refrigerant simply by correspondingly switching the valves.

According to an advantageous embodiment of the refrigeration installation according to the invention, the valve controller comprises the automatic regulator that activates the second valve set-up when an amount of refrigerant in the refrigerant circulation for at least one heat exchanger with refrigerant circulating through it but which is not currently operating as a condenser or gas cooler has fallen below a predetermined amount of refrigerant. Thus, the refrigerant previously collected there in the condenser or gas cooler area can automatically be collected and released into the refrigerant circuit in operation and thus increase the amount of refrigerant there, thereby improving the refrigerating capacity.

According to another advantageous embodiment of the refrigeration installation according to the invention, the valve controller comprises the automatic regulator that activates the second valve set-up when a refrigerant pressure behind or at an expansion element in the refrigerant circulation for at least one heat exchanger which is not currently operating as a with refrigerant flowing through condenser or gas cooler has fallen below a predetermined refrigerant pressure. Thus, the refrigerant previously collected there in the condenser or gas cooler area can automatically be released into the refrigerant circuit in operation and thus increase the pressure there, thereby improving the refrigerating capacity.

The first and/or second heat exchanger(s) is/are preferably designed as a switchable heat exchanger(s) with heating pipes impingeable upon by refrigerant and with cooling pipes impingeable upon by refrigerant integrated into the case and is/are operational as an evaporator with a pre-connected expansion element in the refrigerant circulation flowing through the respectively other of the two heat exchangers operable as a condenser or gas cooler. Switchable does not mean, however, that both the heating pipes and the cooling pipes cannot be impingeable upon by refrigerant at the same time, but rather that condenser or gas cooler area and evaporator area can be parallel in one heat exchanger and the heat exchanger is built to be operable in both operating modes. Thus, two refrigerant circuits in two heat exchangers can exist alternatingly, wherein the condenser or gas cooler area not currently in operation for refrigerant cooling can serve for refrigerant displacement.

According to an advantageous updated version, at least one of the at least first and second heat exchangers that can operate as a condenser or gas cooler comprises in its condenser or gas cooler area at least one reservoir for refrigerant attached in the refrigerant line to the heating pipes designed as flat tubes. The volume for refrigerant displacement is thus advantageously increased.

As a further improvement, the first and/or third valve(s) is/are designed as a pressure valve(s). Thus, the respective valve can automatically open upon exceeding a predetermined pressure or close upon falling below a predetermined pressure. Thus, at least one part of the valve controller is advantageously contained in the respective valve.

The second and/or fourth valve(s) is/are advantageously designed as a throttle valve(s). A throttle valve can serve as an expansion element.

According to an advantageous updated version of the refrigeration installation according to the invention, in the refrigerant line at or behind the condenser or gas cooler outlet of the first heat exchanger and in front of the second valve is contained a junction to a further valve, which is provided in the refrigerant line in front of or at the evaporator inlet of the first heat exchanger. Thus, refrigerant collected in the condenser or gas cooler area of the first heat exchanger can also be released through the evaporator area of the same heat exchanger into the refrigerant circuit running through there.

Preferably, in the cooler line at or behind the condenser or gas cooler outlet of the second heat exchanger and in front of the fourth valve is contained a junction to a further valve, which is provided in the refrigerant line in front of or at the evaporator inlet of the second heat exchanger. Thus, refrigerant collected in the condenser or gas cooler area of the second heat exchanger can also be released through the evaporator area of the same heat exchanger into the refrigerant circuit running through there.

Advantageously, the further valve(s) is/are designed as an expansion element(s), preferably as a throttle valve(s). The cooling effect of the respective downstream evaporator can also be improved in this way.

According to an advantageous embodiment of the refrigeration installation according to the invention, it is designed as a refrigeration installation for a vehicle. It can thus be used, for example, to air condition a passenger area. Particularly advantageous is an embodiment that can be installed on or partially integrated into a vehicle roof, e.g. that of a bus or a railway vehicle.

Finally, the features of the dependent claims can essentially be combined freely with one another and are not set by the order present in the claims, provided that they are independent from one another.

The second task is fulfilled by a refrigeration installation system according to the features of claim 19. Corresponding embodiments also apply accordingly like to the refrigeration installation system according to the invention and its advantageous embodiments, updated versions and improvements with regards to the refrigeration installation system according to the invention.

The third task is fulfilled by a method according to the features of claim 20. This is a cost-efficient, material-saving and space-saving method for refrigerant displacement. Furthermore, the embodiments apply mutatis mutandis to the refrigeration installation system according to the invention and its advantageous embodiments, updated versions and improvements with regard to the method according to the invention. Additionally, according to an advantageous updated version of the method according to the invention, the valve controller for the third and fourth valves is regulated such that, if necessary, the refrigerant is held or collected in the condenser or gas cooler area of the second heat exchanger when the first valve set-up is switched on and such that the refrigerant possibly present in the condenser or gas cooler area of the second heat exchanger is introduced into the refrigerant circuit currently in operation through the condenser or gas cooler area of the first heat exchanger when the second valve set-up is switched on. Thus, refrigerant displacement also takes placed in the condenser or gas cooler area of the second heat exchanger. This provides a more flexible method for refrigerant displacement.

According to an advantageous updated version of the method according to the invention, this contains the steps to recognize an amount of refrigerant in the current refrigerant circulation that has fallen below a predetermined amount of refrigerant and thereafter the activation of the second valve set-up for the heat exchanger which is not currently operating as a with refrigerant flowing through condenser or gas cooler. Thus, refrigerant is automatically released into the refrigerant circuit in operation, thereby improving its efficacy.

A further improvement is represented by the steps of recognizing a refrigerant pressure behind the compressor in the current refrigerant circulation that has fallen below a predetermined refrigerant pressure and thereafter activating the second valve set-up for the heat exchanger which is not currently operating as a with refrigerant flowing through condenser or gas cooler. Thus, refrigerant is automatically released into the refrigerant circuit in operation, thereby improving the pressure.

According to an advantageous embodiment of the method according to the invention, the valve controller for the first and second valves and/or for the third and fourth valves is regulated such that in the third valve set-up with open first and at the same time open second valves, the first heat exchanger is operated as a condenser or gas cooler and/or with open third and at the same time open fourth valves, the second heat exchanger is operated as a condenser or gas cooler. As a result, the condensers or gas coolers can also be operated to cool the refrigerant.

The method according to the invention preferably comprises the steps of activating the third valve set-up for the third and fourth valves and adjusting the first heat exchanger, designed as a switchable heat exchanger, as an evaporator in the refrigerant circulation flowing through the second heat exchanger operating as a condenser or gas cooler. This method with refrigerant displacement is suitable for a compact design with switchable a heat exchanger. Just as advantageous are the method steps of activating the third valve set-up for the first and second valves and adjusting the second heat exchanger designed as a switchable heat exchanger as an evaporator in the refrigerant circulation flowing through the first heat exchanger operating as a condenser or gas cooler.

According to an advantageous embodiment of the method according to the invention, it comprises the steps of recognizing a refrigerant pressure in front of or at either a closed first or closed third valve that exceeds a predetermined refrigerant pressure and thereafter adjusting the first valve set-up at either the previously closed first or the previously closed third valve. Thus, refrigerant is transferred from the refrigerant circuit in operation to the condenser or gas cooler area respectively without refrigerant circulating through it and thus automatically reduces the pressure in the refrigerant circuit in operation. Damage to the refrigeration installation due to excessive pressure is avoided.

An improvement of the method according to the invention is represented by the steps of recognizing an amount of refrigerant in the current refrigerant circulation that exceeds a predetermined amount of refrigerant and thereafter activating the first valve set-up at the either previously closed first or at the previously closed third valve. Thus, refrigerant is transferred from the refrigerant circuit in operation to the condenser or gas cooler area respectively without refrigerant circulating through it and thus automatically and advantageously reduces the amount of refrigerant in the refrigerant circuit in operation.

According to an advantageous updated version of the method according to the invention, it comprises the alternative with the steps of activating the valve set-up with a closed first and closed second valve and thereafter activating the opening of the further valve provided in the refrigerant line branching off at or behind the condenser or gas cooler outlet of the first heat exchanger and in front of the second valve and provided in front of or at the evaporator inlet of the first heat exchanger designed as a switchable heat exchanger. Thus, the refrigerant collected in the condenser or gas cooler area of the first heat exchanger is optionally released through the evaporator of the same heat exchanger into the refrigerant circuit running through there. Correspondingly advantageous are the method steps of activating the valve set-up with a closed third and closed fourth valve and thereafter activating the opening of the further valve provided in the refrigerant line branching off at or behind the condenser or gas cooler outlet of the second heat exchanger and in front of the fourth valve and provided in front of or at the evaporator inlet of the second heat exchanger designed as a switchable heat exchanger.

Finally, with regards to the method according to the invention, the features of the dependent claims can also essentially be combined freely with one another and are not set by the order present in the claims, provided that they are independent from one another

SHORT DESCRIPTION OF THE DESIGNS

Embodiments of the invention are exemplified through designs.

Figure 1B:
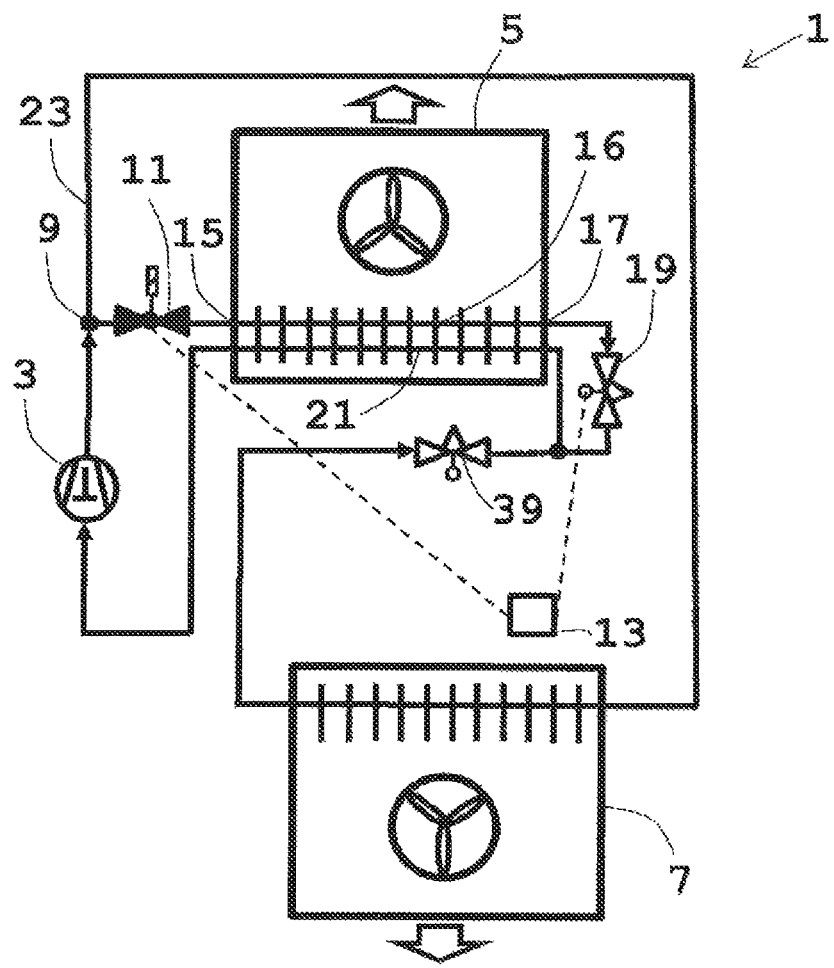
Figure 2:
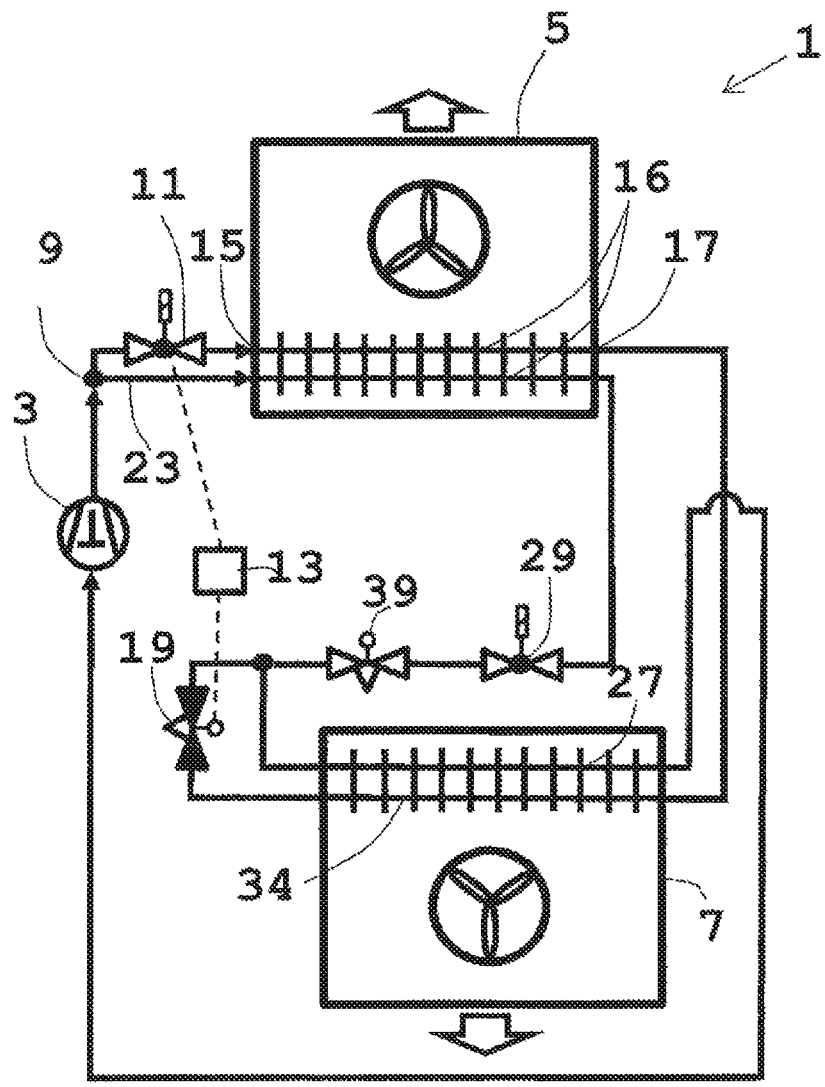
Figure 3:
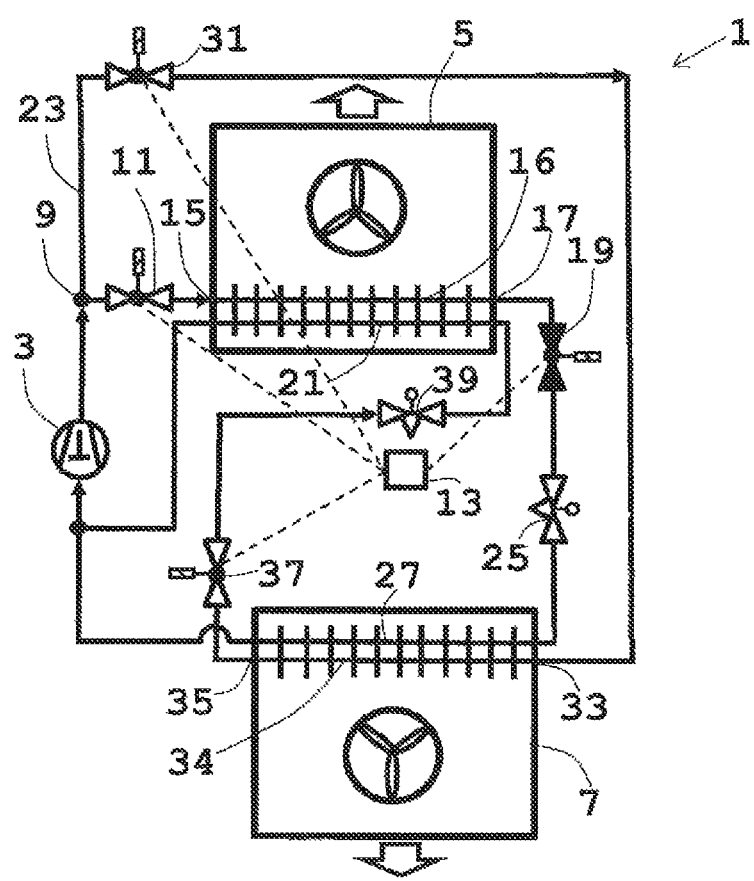
Figure 4:
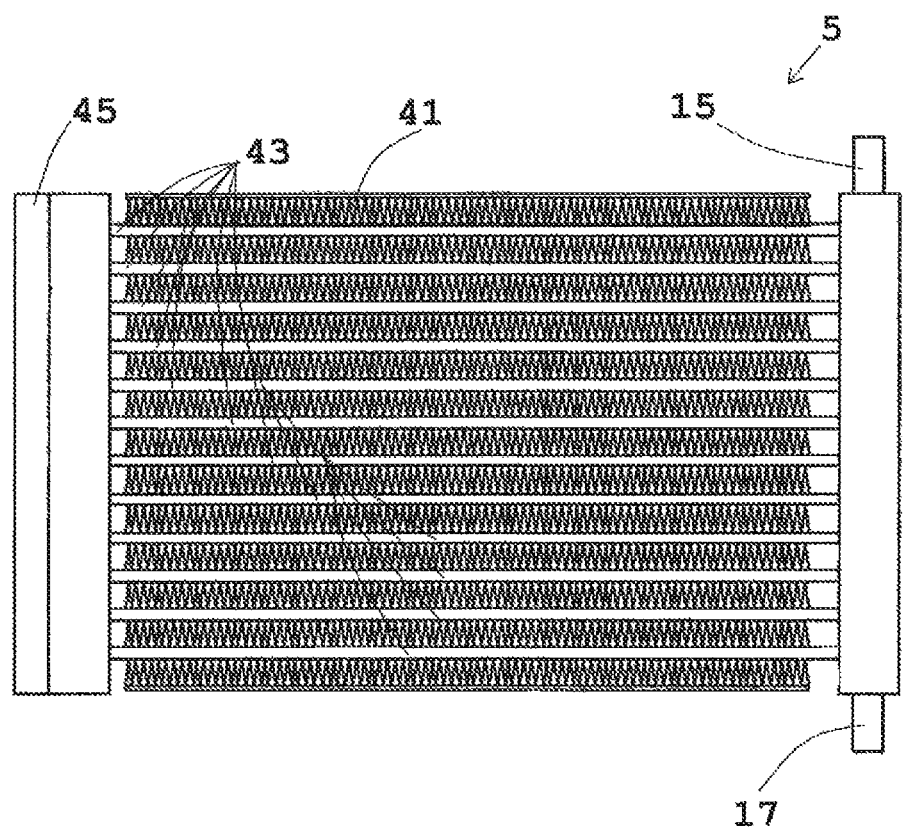
Figure 5:
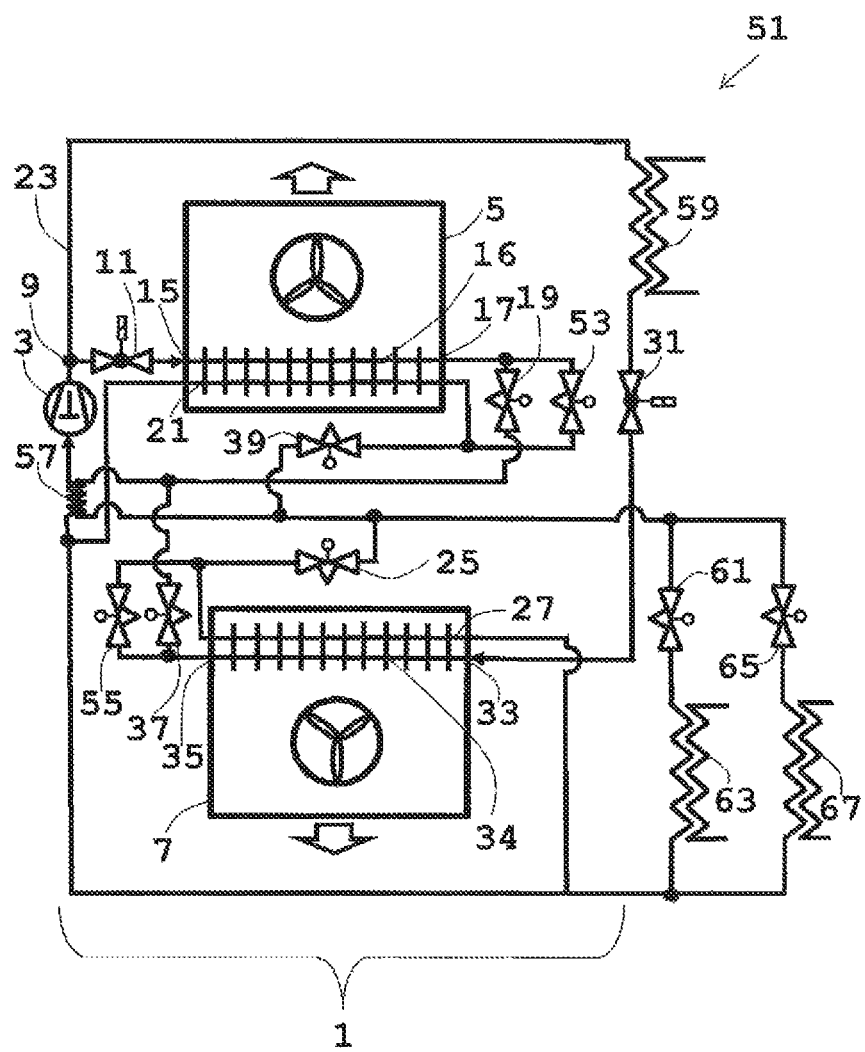
Figure 6:
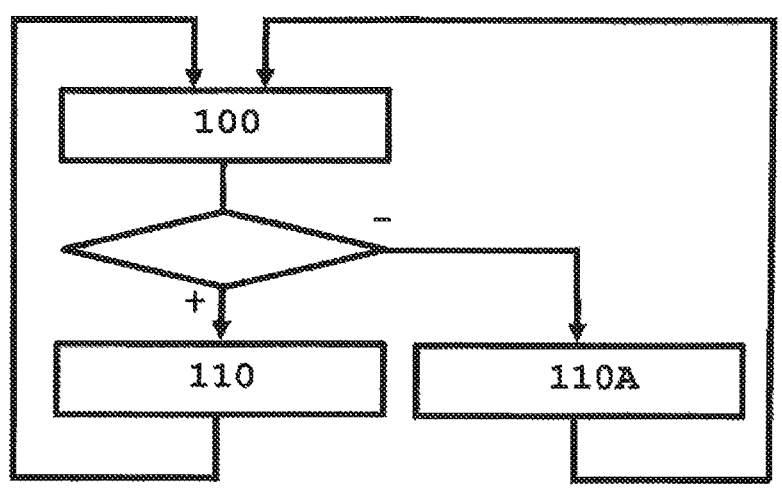
Figure 7:
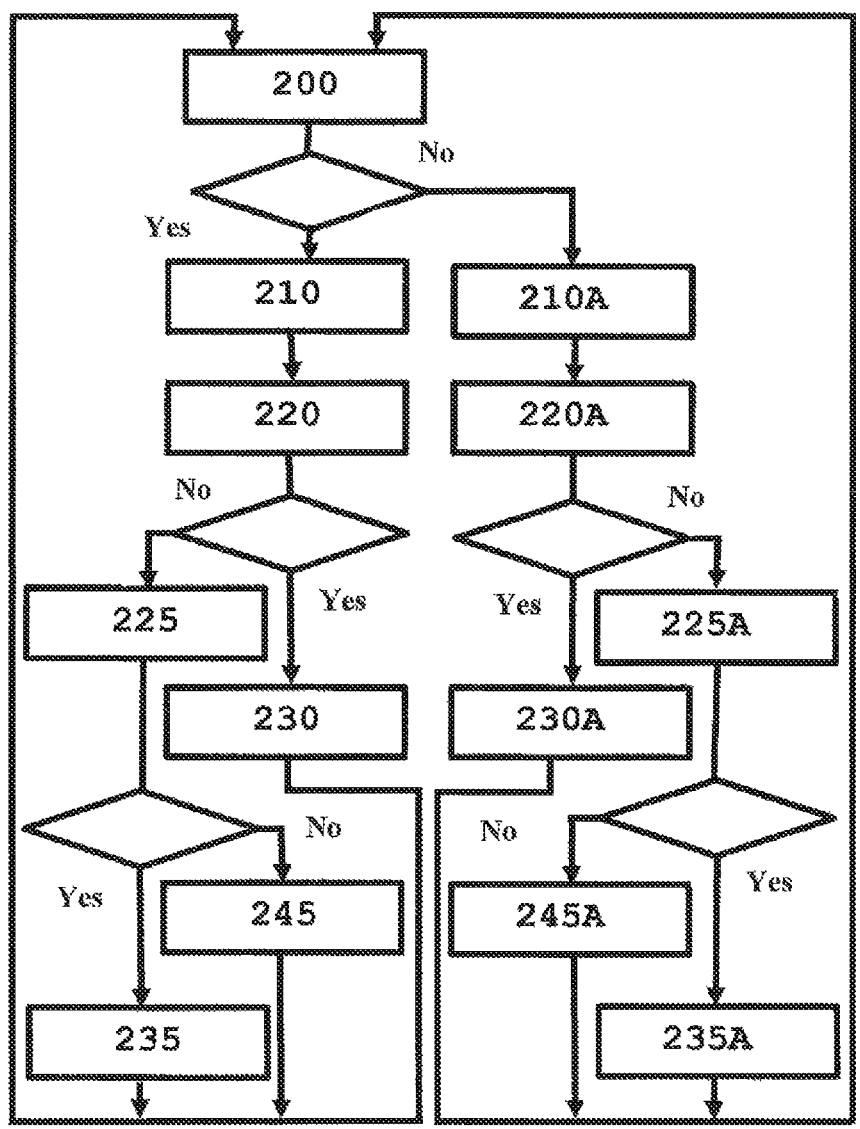

FIG. 1a depicts an embodiment of a refrigeration installation in the first valve set-up, FIG. 1b depicts the same embodiment of a refrigeration installation in the second valve set-up, FIG. 2 depicts a further embodiment of a refrigeration installation in the first valve set-up, FIG. 3 depicts a further embodiment of a refrigeration installation in the first valve set-up, FIG. 4 depicts an embodiment of a heat exchanger with a reservoir attached to the heating pipes designed as flat tubes, FIG. 5 depicts an embodiment of a refrigeration installation system with a refrigeration installation and a refrigerant circuit with exemplary expansions, FIG. 6 depicts an embodiment of a method for refrigerant displacement as a flow chart, and FIG. 7 depicts a further embodiment of a method for refrigerant displacement as a flow chart.

DETAILED DESCRIPTION OF THE INVENTION

All illustrations should be understood schematically. The designs were not drawn to scale in order to increase the clarity of the representations.

FIGS. 1a and 1b depict a refrigeration installation 1 for controlling the temperature of the air with a compressor 3, the expansion element 39 as well as the second valve 19 designed as an expansion element and with a first heat exchanger 5 and a second heat exchanger 7. The refrigerant is compressed in the compressor 3, wherein not only one but also multiple compressors 3 can be imagined, and flows in the refrigerant line to a junction 9. The junction 9 is the site in the refrigerant line at which the refrigerant line divides in one area to the condenser or gas cooler inlet 15 of the first heat exchanger 5 and in another branching area 23, into which is integrated the second heat exchanger 7. Both heat exchangers 5 and 7 are constructed so that they can be operated as condensers. In a refrigeration installation 1 operated in the transcritical area, the heat exchangers 5 and 7 are constructed so that they can be operated as gas coolers. A refrigerant circuit of the refrigeration installation 1 runs from the junction 9 through the branching area 23 through the condenser or gas cooler area of the second heat exchanger 7 to the expansion element 39, for example as an expansion valve, and further through the evaporator area 21 of the first heat exchanger 5 back to the compressor 3 and again to the junction 9. During this process, the first heat exchanger 5 acts as an evaporator. The first heat exchanger 5 is designed, in this case, as a switchable heat exchanger with heating pipes impingeable upon by refrigerant and with cooling pipes impingeable upon by refrigerant integrated into the case. Thus, there is also both a condenser or gas cooler area 16 and an evaporator area 21 in the first heat exchanger 5 and the first heat exchanger 5 is built to be operated in both modes. In the other area of the refrigerant line, a first valve 11 is provided between the junction 9 and the condenser or gas cooler inlet 15 of the first heat exchanger 5. This first valve 11 is controlled by the valve controller 13. It is also imaginable to have a valve controller provided directly at the first valve 11, for example with a pressure valve, which contains the automatic valve controller with opening of the first valve 11 upon exceeding a predetermined pressure in the refrigerant line at the sides behind the compressor 3 including the simultaneous automatic closing of the second valve 19 designed as an expansion element and upon falling below a lower predetermined pressure with automatic closing of the first valve 11. In FIG. 1A, the first valve 11 is open and at the same time the second valve 19 is closed. The valve controller 13 has therefore activated the first valve set-up. Thus, refrigerant coming from the compressor 3 go move through the condenser or gas cooler inlet 15 into the condenser or gas cooler area 16 of the first heat exchanger 5 and, due to the closed second valve 19, be collected there. Refrigerant is therefore transferred to the refrigerant circuit running through the branching area 23 with the second heat exchanger 7 and thus transferred to the first heat exchanger 5. In FIG. 1b of the valve controller 13, on the other hand, the second valve set-up with a closed first valve 11 and at the same time an open second valve 19 is activated.

Thus, if necessary, refrigerant collected or held in the first heat exchanger 5 can flow through the condenser or gas cooler outlet 17 and through the second valve 19 to the evaporator area 21 of the first heat exchanger 5 and thus be released into the refrigerant circuit running through the branching area 23 with the second heat exchanger 7. The second valve 19 is designed as an expansion element, for example as a throttle valve, as an electrically controllable expansion valve or particularly as a stepper motor valve or as a pulse magnet valve. Also imaginable is the variant in which an expansion element is downstream of the second valve 19. Furthermore, it is imaginable for the valve controller 13 to comprise the automatic regulator that, upon exceeding a predetermined amount of refrigerant in the refrigerant circuit in operation in the case of the first heat exchanger 5 which is not currently operating as a with refrigerant flowing through condenser or gas cooler, activates the first valve set-up for the same.

A refrigeration installation 1 represented in FIGS. 1a and 1b is designed for use in a vehicle, e.g. installed on or partially integrated into a vehicle roof.

Represented in FIG. 2 is a further embodiment of a refrigeration installation 1 for controlling the temperature of the air in the first valve set-up. Behind the compressor 3 in the refrigerant line is the junction 9 at which the refrigerant line is divided into the branching area 23 and the area with the first valve 11. The refrigerant circulation with the branching area 23 takes place over a condenser or gas cooler area 16 of the first heat exchanger 5, over the shut-off valve 29 to the expansion element 39 and further through the evaporator area 27 of the second heat exchanger 7 back to the compressor 3. The other branch of the refrigerant line behind the junction 9 leads to the first valve 11 and further to the condenser or gas cooler inlet 15 of a further condenser or gas cooler area 16 of the first heat exchanger 5. From its condenser or gas cooler outlet 17, this branch of the refrigerant line then leads through the condenser or gas cooler area 34 of the second heat exchanger 7 to the second valve 19, which in this case is an expansion element. Also imaginable is the variant structure in which the refrigerant is first released through a condenser or gas cooler area 34 of the second heat exchanger 7 and then through that 16 of the first heat exchanger 5 to the second valve 19. The refrigerant line then moves through the evaporator area 27 of the second heat exchanger 7 back into the compressor 3. The second heat exchanger is designed as a switchable heat exchanger with heating pipes impingeable upon by refrigerant and with cooling pipes impingeable upon by refrigerant and integrated into the case, wherein the evaporator area 27 and the condenser or gas cooler area 34 can also be impinged on by refrigerant. Thus, in the refrigeration installation 1, there are practically two refrigerant circuits that run together at least from the compressor 3 to the junction 9. Represented is the valve controller 13 in the first valve set-up with an open first valve 11 and a closed second valve 19. Thus, refrigerant can be collected in a condenser or gas cooler area 16 of the first heat exchanger and transferred into a condenser or gas cooler area 34 of the second heat exchanger 7 and thus extracted from the refrigerant circuit through the branching area 23. The valve controller 13 moreover comprises the valve set-up with a closed first valve 11 and at the same time an open second valve 19 not depicted in FIG. 2. Thus, if necessary, refrigerant collected or stored in the first heat exchanger 5 and second heat exchanger 7 in the condenser or gas cooler area can flow into the refrigerant circuit through the branching area 23 and thus be transferred there. Furthermore, the valve controller 13 contains the third valve set-up with both an open first valve 11 and an open second valve 19 not depicted in FIG. 2. Thus, a refrigerant circuit operated by the area of the refrigerant line with the first and second valves 11, 19 is activated. A valve controller contained in the valves 11 and 19 is imaginable, which, for example, automatically activates, depending on the corresponding sensor signals over the refrigerant circuit running through the branching area 23, the first valve set-up upon exceeding a predetermined amount of refrigerant and the second valve set-up upon falling below a predetermined lower or equal amount of refrigerant.

In FIG. 3, a further embodiment of a refrigeration installation 1 in a first valve set-up is shown. A first refrigerant circuit runs from the compressor 3 over the junction 9 through the first valve 11 into the condenser or gas cooler inlet 15 of the first heat exchanger 5 further through the condenser or gas cooler area 16 out of the condenser or gas cooler outlet 17 to the second valve 19 to the expansion element 25, through the evaporator area 27 of the second heat exchanger 7 back to the compressor 3. Due to the closed second valve 19, this refrigerant circuit is not currently in operation, but the valve controller 13 has activated the first valve set-up at the same time with an open first valve to collect and transport refrigerant into the condenser or gas cooler area 16 of the first heat exchanger 5. Furthermore, the valve controller 13 for the first valve 11 and the second valve 19 contains the second and third valve set-ups not depicted in FIG. 3. A second refrigerant circuit runs originally from the compressor 3 to the junction 9 together with the first refrigerant circuit. After the junction 9, the second refrigerant circuit goes in the refrigerant line in the branching area 23 through the third valve 31, through the condenser or gas cooler inlet 33 into the condenser and gas cooler area 34 of the second heat exchanger 7 and from there through the condenser or gas cooler outlet 35 to the fourth valve and thereafter through the expansion element 39 and the evaporator area 21 of the first heat exchanger 5 finally back to the compressor 3. FIG. 3 shows for the third valve 31 and the fourth valve 37 the third valve set-up of the valve controller 13, i.e. with an open third valve 31 and a closed fourth valve 37. Thus, the second refrigerant circuit currently has its valve switch set to operate. For the third valve 31 and the fourth valve 37, the valve controller 13 also comprises the first and second valve set-ups not depicted in FIG. 3, i.e. firstly with an open third valve 31 and at the same time a closed four valve 37 or secondly with a closed third valve 31 and at the same time an open fourth valve 37. A meaningful variant involves combining the junction, the first valve 11 and the third valve 31 into a single three-way valve. Furthermore, it is imaginable for the second valve 19 and/or the fourth valve 37 to also be designed as an expansion element(s) and for the additional expansion elements 25 and 39 in the respective refrigerant circuit to be correspondingly omitted. For this purpose, throttle valves, electrically controllable expansion valves and particularly stepper motor valves or pulse magnet valves can be considered, for example. Also imaginable is a valve controller directly on the first, second, third, and fourth valves 11, 19, 31 and 37, as seen, for example, in pressure valves or valves with sensor controllers, e.g. regarding the amount of refrigerant. This is how it is with the first refrigerant circuit currently in operation upon exceeding a predetermined pressure or pressure value behind the compressor 3 or upon exceeding a predetermined amount of refrigerant or refrigerant amount value in the circulating first refrigerant circuit with the automatic valve controller 13 activating the first valve set-up for the third valve 31 and the fourth valve 37 and, inversely, upon falling below a given pressure or pressure value behind the compressor 3 or in front of or at the respective expansion element 19, 25 of the first refrigerant circuit or upon falling below a predetermined amount of refrigerant or refrigerant amount value in the operating first refrigerant circuit with the automatic controller 13 activating the second valve set-up for the third valve 31 and the fourth valve 37. The valve controller 13 correspondingly activates the first valve 11 and the second valve 19 for the currently circulating or operating second refrigerant circuit. The first or second heat exchanger 5, 7 which is not currently operating as a with refrigerant flowing through condenser or gas cooler is used for refrigerant displacement based on which of the two refrigerant circuits is currently operating. The first and second heat exchangers 5, 7 are, in this case, designed as switchable heat exchangers with heating pipes impingeable upon by refrigerant and with cooling pipes impingeable upon by refrigerant integrated into the case and are operational as an evaporator with a pre-connected expansion element in the refrigerant circulation flowing through the respectively other of the two heat exchangers operable as a condenser or gas cooler. The condenser or gas cooler area 16, 34 not currently operating as a condenser or gas cooler is used as a reservoir to collect or displace refrigerant.

In FIG. 4, an embodiment of a first heat exchanger 5 with a condenser or gas cooler inlet 15 in the upper right and heating pipes 43 with lamellae 41 in between, which heating pipes run parallel to one another in the condenser or gas cooler area of the heat exchanger as flat tubes, is depicted as an example, which heat exchanger contains a reservoir 45 for refrigerant attached in the refrigerant line to the heating pipes 43 designed as flat tubes. The refrigerant can thus be collected in the first heat exchanger 5 in a sufficient volume and, as needed, be released again through the condenser or gas cooler outlet 17 for the operation of the respective refrigerant circuit. The reservoir 45 can also be provided at another site in the condenser and gas cooler area of the first and/or second heat exchanger(s) 5, 7. Furthermore, multiple reservoirs 45 at various sites in a condenser and gas cooler area of a heat exchanger are imaginable.

A refrigeration installation 1 depicted in FIG. 3 is designed for use in a vehicle, e.g. installed on or partially integrated into a vehicle roof of a bus. Also imaginable is a refrigeration installation 1 with not only first and second heat exchangers 5, 7, but also further heat exchangers, e.g. a third heat exchanger that serves as an evaporator in the refrigerant circuits through the first and second heat exchangers 5, 7 operable as condensers or gas coolers.

In FIG. 5, an embodiment of a refrigeration installation system 51 with a refrigeration installation 1 and a refrigerant circuit with exemplary expansions is represented. Here, too, the refrigerant line divides into one branching area 23 coming from the compressor 3 to the junction 9 and one moving through the first valve 11 to the condenser or gas cooler area 15 of the first heat exchanger 5. One path of the refrigerant line connecting to the condenser or gas cooler area 16 of the first heat exchanger 5 through the condenser or gas cooler outlet 17 leads through the second valve 19 over an internal heat exchanger 57 to the expansion elements 25, 61 and 65 or even to the expansion element 39. The valve controller is, in this case, directly on the valves. Also imaginable, however, is a central unit serving as a valve controller. Thus, in the first valve set-up for the first valve 11 and the second valve 19, provided that in addition to the second valve 19 also the further valve 53 is closed, the condenser or gas cooler area 16 of the first heat exchanger 5 serves as a refrigerant reservoir to which refrigerant is transported. In the second valve set-up, if necessary, refrigerant is then released against into the currently operating refrigerant circuit. In the third valve set-up with an open first valve 11 and open second valve 19, the refrigerant circuit then running further through one or more of the expansion elements 26, 61, 65 and 39 such as over expansion element 25 through the evaporator area 27 of the second heat exchanger 7 back to the compressor 3 is ready for operation or in operation. Parallel to the expansion element 25 and the evaporator 27 of the second heat exchanger 7 in the refrigeration installation system 51 are connected an expansion element 61 with, for example, a downstream plate heat exchanger 63 for cold water for batteries as well as a further expansion element 65 in front of a heat exchanger 67, for example, for cold air for the driver. Instead of or in addition to these additional heat exchangers for drivers and batteries, further and/or other heat exchangers for cooling purposes are imaginable in the refrigeration installation system 51.

Furthermore, behind the condenser or gas cooler outlet 17 of the first heat exchanger 5 and in front of the second valve 19 is contained a junction to a further valve 53, which is provided in the refrigerant line in front of or at the evaporator inlet of the first heat exchanger 5. This further valve 53 is, in this case, an expansion element, e.g. a throttle valve. When the further valve 53 is open, refrigerant can, if necessary, flow out of the condenser or gas cooler area of the first heat exchanger 5 over its evaporator area 21 to the compressor 3 and thus be introduced into the refrigerant circuit currently in operation. There is also, in addition to the second valve 19, a further possibility for moving refrigerant collected in the first heat exchanger 5 into the refrigerant circuit in operation.

However, the condenser or refrigerant area of the second heat exchanger 7 can also be used as a refrigerant reservoir. In front of the third valve 31, for example, a plate heat exchanger 59 for warm water for convectors and drivers is installed in the refrigeration installation system 51 in the refrigerant line in the branching area 23. The third valve is upstream of the condenser or gas cooler inlet 33 of the second heat exchanger 7. The valve controller is located in this case at the valves. Also imaginable, however, is the variant of a central valve controller. When the first valve set-up with the third valve 33 and fourth valve 37 as well as a closed further valve 55 is activated, the condenser or gas cooler area 34 of the second hear exchanger 7 serves as a refrigerant reservoir. Here, the condenser or gas cooler area 34 can, for example, comprise a reservoir attached in the refrigerant line to the heating pipes designed as flat tubes. A path of the refrigerant line connecting at the condenser or gas cooler area 34 of the second heat exchanger 7 through the condenser or gas cooler outlet 35 leads through the fourth valve 37 over an internal heat exchanger 57 to the expansion elements 25, 61 and 65 or even to the expansion element 39. In the second valve set-up for the third valve 31 and the fourth valve 37, refrigerant is also, if necessary, released again into the refrigerant circuit in operation. In the third valve set-up for the third valve 31 and the fourth valve 37, the cooling circuit over the branching area 23 is ready for operation or in operation.

Additionally, behind the condenser or gas cooler outlet 35 of the second heat exchanger 7 and in front of the fourth valve 37 is contained a junction to a further valve 55, which is provided in the refrigerant line in front of or at the evaporator inlet of the second heat exchanger 7. This further valve 55 is, in this case, an expansion element, e.g. a throttle valve. When the further valve 55 is open, refrigerant can, if necessary, flow out of the condenser or gas cooler area 34 of the second heat exchanger 7 over its evaporator area 27 to the compressor 3 and thus be released into the currently operation refrigerant circuit. Thus, in addition to the fourth valve 37, there is a further possibility in the second heat exchanger 7 to transporting collected refrigerant into the currently operating refrigerant circuit. The valves 11, 19, 31, 37, 53 and 55 are valves controlled in the refrigerant circuit according to pressures or pressure values. When the refrigerant pressure exceeds or falls below one or two predetermined refrigerant pressure(s) behind the compressor 3 or in front of or at an expansion element in the third valve set-up activated in a refrigerant circuit, either the first or the second valve set-up, depending thereupon, is activated in the other refrigerant circuit currently without refrigerant circulating through it. Also imaginable, however, is a central valve controller that, for example, processes sensor signals 5 concerning the amount of refrigerant in the currently operating refrigerant circuit and activates the corresponding valve set-up. Also imaginable is an embodiment of the refrigeration installation 1 with an additional intentional option of the valve set-up in the valve controller for automatic regulation when using the refrigeration installation 1.

The refrigeration installation system 51 shown in FIG. 5 can be flexibly operated, wherein both the first heat exchanger 5 and the second heat exchanger 7 can be used for refrigerant displacement. A refrigeration installation system is not limited to the refrigeration installation system 51 represented, but can, for example, comprise multiple such refrigeration installations 1 as well as further attached heat exchangers. It can be used in a vehicle with one or multiple refrigeration installation(s) 1, e.g. installed on or partially integrated into a vehicle roof, e.g. that of a railway vehicle.

In FIG. 6, an embodiment of a method for refrigerant displacement is shown as a flow chart. The method can be used in operation a refrigeration installation as represented in FIGS. 1*a*, 1*b*, 2, 3 and 5. In the first step 100 of the method, it is recognized that the pressure of the refrigerant in the currently operating refrigerant circuit behind the compressor exceeds a predetermined pressure or pressure value. A variant of step 100 is the recognition that the amount of refrigerant in the currently operating circulation circuit exceeds a predetermined value or amount of refrigerant. In the second step 110 of the method, the valve controller for the first and second valves then activates the first valve set-up or leaves this setting if already active, i.e. open first and closed second valves. Refrigerant is thereby held or collected in the condenser or gas cooler area of the first heat exchanger, if necessary. If, on the other hand, it is recognized in the first step 100 that the refrigerant pressure in the currently operating refrigerant circuit behind the compressor has fallen below a predetermined pressure or pressure value, step 110A occurs instead of step 100. A variant of this step 100 is the recognition that the amount of refrigerant in the currently operating refrigerant circuit has fallen below a predetermined value or amount of refrigerant. In step 110A, the second valve set-up of the first heat exchanger which is not currently operating as a with refrigerant flowing through condenser or gas cooler is activated or, if already active, deactivated. Thus, the first valve is closed and the second valve opened. The refrigerant that may be present in the condenser or gas cooler area of the first heat exchanger is released in the currently operating refrigerant circuit. When operating the refrigeration installation, the method begins again regularly with step 100.

In FIG. 7, a further embodiment of a method for refrigerant displacement is shown as a flow chart. The method can be used when operating a refrigeration installation or a refrigeration installation system as shown in FIG. 5. In the first step 200 of the method, it is determined whether the first refrigerant circuit running through the condenser or gas cooler area of the first heat exchanger should be operated or not and instead the second refrigerant circuit running through the condenser or gas cooler area of the second heat exchanger. The subsequent decision for the case that the first refrigerant circuit should be circulated leads to step 210 of the method, in which the third valve set-up for the first and second valves, i.e. both open, is activated or remains activated. Then, based, on the measurement of the refrigerant pressure or the amount of refrigerant in the operating first refrigerant circuit in the area behind the compressor, it is recognized whether the pressure or pressure value or amount of refrigerant or refrigerant amount exceeds or has fallen below a predetermined pressure or pressure value or a predetermined amount of refrigerant or refrigerant amount value. If an excessive value is determined the path with step 230 of the method is taken with the decision "Yes." In step 230, the first valve set-up for the third and fourth valves with open third valve and at the same time closed fourth valve is activated. Furthermore, the further valve provided in the refrigerant line branching at or behind the condenser or gas cooler outlet of the second heat exchanger and in front of the fourth valve and provided in front of or at the evaporator inlet of the second heat exchanger designed as a switchable heat exchanger is closed. With step 230, refrigerant is held or collected in the condenser or gas cooler area of the second heat exchanger, if necessary. The method is carried out again beginning with step 200 at determined time intervals. If, on the other hand, a value below the predetermined value is determined in step 220, the path with step 225 of the method is taken with the decision "No." In step 225 of the method, according to need, e.g. whether the condenser or gas cooler area of the second heat exchanger should also be cooled or not, it is evaluated whether a release of refrigerant into the currently operation refrigerant circuit through the fourth valve is performed of not and instead the collected refrigerant is released through the further valve as an expansion element, e.g. as a throttle valve, as well as through the evaporator area of the second heat exchanger that is a switchable heat exchanger into the first refrigerant circuit. With the decision "Yes," i.e. release of refrigerant through the fourth valve, step 235 of the method is performed with the activation of the second valve set-up for the third and fourth valves with the simultaneous closing of the further valve in front of the evaporator area of the second heat exchanger and with simultaneous closing of the second valve and opening of the further valve in front of the evaporator area of the first heat exchanger. If, on the other hand, based on the evaluation in the automatically running step 225, the decision is "No," step 245 of the method occurs, with the closing of the third and fourth valves and the opening of the further valve in front of the evaporator area of the second heat exchanger. Then, the method is also carried out again beginning with step 200 at determined time intervals.

If operation of the second refrigerant circuit is activated in the decision based on the beginning step 200, the method running thereafter corresponds to the one previously described with the corresponding steps 210A, 220A, 225A, 230A, 235A and 245A, wherein, however, the previously described valve set-up for the first and second valves applies for the third and fourth valves and, inversely, the previously described valve set-up for the third and fourth valves applies for the first and second valves. The further valve is, in this case, provided in the refrigerant line branching at or behind the condenser or gas cooler outlet of the first heat exchanger and in front of the second valve and provided in front of or at the evaporator inlet of the first heat exchanger, which is also a switchable heat exchanger. The method can be used for a refrigeration installation of the former art in a vehicle, e.g. installed on or partially integrated into a vehicle roof, as well as for a refrigeration installation system comprising one or multiple refrigeration installations of the prior art.

The invention claimed is:

1. A refrigeration installation (1) for controlling the temperature of air with at least one compressor (3), at least two expansion elements and at least one first (5) and a second (7) heat exchanger, each of which can be operated as a condenser or gas cooler, and at least one of the heat exchangers or another heat exchanger can be operated as an evaporator, wherein in a refrigerant line a first valve (11) is provided behind the at least one compressor (3) at or behind a junction (9) and in front of or at a condenser or gas cooler inlet (15) of the first heat exchanger (5) and in front of a first expansion element (25) of the at least two expansion elements and wherein a second valve (19) is provided at or behind a condenser or gas cooler outlet (17) of the first heat exchanger (5) and in front of or as part of the first expansion element (25), wherein the refrigeration installation (1) also comprises one or more valve controllers, the one or more valve controllers adapted to control the first (11) and second (19) valves for refrigerant displacement, which one or more valve controllers are adapted to control the operations of at least a first and a second valve set-up, firstly with an open first valve (11) and at the same time a closed second valve (19) or secondly with a closed first valve (11) and at the same time an open second valve (19), characterized in that the one or more valve controllers comprise an automatic regulator that is designed to activate the first valve set-up, upon:
exceeding a predetermined amount of refrigerant in a refrigerant circuit when at least the first heat exchanger (5) is not currently operating as a condenser or gas cooler with refrigerant flowing through the condenser or gas cooler;
or upon:
exceeding a predetermined refrigerant pressure behind the compressor (3) in the refrigerant circuit when at least the first heat exchanger (5) is not currently operating as a condenser or gas cooler with refrigerant flowing through the condenser or gas cooler.

2. The refrigeration installation (1) according to claim 1 characterized in that the one or more valve controllers are also designed to control a switch of a third valve set-up with an open first valve (11) and at the same time an open second valve (19).

3. The refrigeration installation (1) according to claim 1 characterized in that the first valve (11) is constructed as a pressure valve.

4. The refrigeration installation (1) according to claim 1, wherein in the refrigerant line a third valve (31) is provided at or behind the junction (9) in the branching area (23) and in front of or at the condenser or gas cooler inlet of the second heat exchanger (7) and wherein a fourth valve (37) is provided at or behind a condenser or gas cooler outlet of the second heat exchanger (7) and in front of or as part of a second expansion element (39) of the at least two expansion elements, characterized in that the one or more valve controllers are further adapted to control the third (31) and fourth (37) valves, which one or more valve controllers are designed to control the operations of at least a first and a second valve set-up for the third (31) and fourth (37) valves, firstly with an open third valve (31) and at the same time a closed fourth valve (37) or secondly with a closed third valve (31) and at the same time a closed fourth valve (37).

5. The refrigeration installation (1) according to claim 4 characterized in that the first (11) and third (31) valves together form a single three-way valve.

6. The refrigeration installation (1) according to claim 4 characterized in that the one or more valve controllers are adapted to control a switch of the third valve set-up with an open third valve (31) and at the same time an open fourth valve (37).

7. The refrigeration installation (1) according to claim 4 characterized in that the third valve (31) comprises a pressure valve.

8. The refrigeration installation (1) according to claim 4 characterized in that the second valve (19) and fourth valve (37) are each designed as a throttle valve.

9. The refrigeration installation (1) according to claim 4 characterized in that in the refrigerant line at or behind the condenser or gas cooler outlet of the second heat exchanger (7) and in front of the fourth valve (37) is contained a junction to a further valve (55), which is provided in the refrigerant line in front of or at an evaporator inlet of the second heat exchanger (7).

10. The refrigeration installation (1) according to claim 1 characterized in that the one or more valve controllers comprise an automatic regulator that is designed to activate the second valve set-up, upon falling below a predetermined amount of refrigerant in the refrigerant circuit for at least one of the first and second heat exchangers (5, 7) which is not currently operating as a condenser or gas cooler with refrigerant flowing through the condenser or gas cooler, whereas the second valve set-up for the first heat exchanger (5) is the one of the first (11) and second (19) valves and the second valve set-up for the second heat exchanger (7) is the one of the third (31) and fourth (37) valves.

11. The refrigeration installation (1) according to claim 1 characterized in that the one or more valve controllers comprise an automatic regulator that is designed to activate the second valve set-up, upon falling below a predetermined refrigerant pressure in front of or at an expansion element (25, 39) in the refrigerant circuit, for at least one of the first and second heat exchangers (5, 7) which is not currently operating as a condenser or gas cooler with refrigerant flowing through the condenser or gas cooler, whereas the second valve set-up for the first heat exchanger (5) is the one of the first (11) and second (19) valves and the second valve set-up for the second heat exchanger (7) is the one of the third (31) and fourth (37) valves.

12. The refrigeration installation (1) according to claim 1 characterized in that at least one of the first and second heat exchangers (5, 7) is designed as a switchable heat exchanger(s) with heating pipes (43) adapted to receive refrigerant and with cooling pipes adapted to receive refrigerant, the heating pipes and cooling pipes being integrated into a case, the at least one of the first and second heat exchangers (5, 7) being operational as an evaporator with expansion elements (25, 39) pre-connected in the refrigerant circulation flowing through the respectively other of the first or second heat exchangers (5, 7) operable as a condenser or gas cooler.

13. The refrigeration installation (1) according to claim 1 characterized in that at least one of the at least first and second heat exchangers (5, 7) operable as condensers or gas coolers comprises, in a condenser or gas cooler area (16, 34), a reservoir (45) attached in the refrigerant line to heating pipes (43) designed as flat tubes.

14. The refrigeration installation (1) according to claim 1 characterized in that in the refrigerant line at or behind the condenser or gas cooler outlet (17) of the first heat exchanger (5) and in front of the second valve (19) is contained a junction to a further valve (53), which is provided in the refrigerant line in front of or at an evaporator inlet of the first heat exchanger (5).

15. The refrigeration installation (1) according to claim 14, the further valve being a first further valve, the refrigeration installation further comprising a second further valve (55) characterized in that one or both of the first and second further valve(s) (53, 55) comprise expansion elements.

16. The refrigeration installation (1) according to claim 15 characterized in that the first and second further valves (53, 55) each comprise a throttle valve.

17. The refrigeration installation (1) according to claim 1 characterized in that it is designed as a refrigeration installation (1) for a vehicle.

18. The refrigeration installation (1) according to claim 17 characterized in that it is designed to be installed on or partially integrated into a vehicle roof.

19. A refrigeration installation system (51) with at least one refrigeration installation (1) for controlling the temperature of air with at least one compressor (3), at least two expansion elements and at least one first (5) and a second (7) heat exchanger, each of which can be operated as a condenser or gas cooler, and at least one of the heat exchangers or another heat exchanger can be operated as an evaporator, wherein in a refrigerant line a first valve (11) is provided behind the at least one compressor (3) at or behind a junction (9) and in front of or at a condenser or gas cooler inlet (15) of the first heat exchanger (5) and in front of a first expansion element (25) of the at least two expansion elements and wherein a second valve (19) is provided at or behind the condenser or gas cooler outlet (17) of the first heat exchanger (5) and in front of or as part of the first expansion element (25), wherein the refrigeration installation (1) also comprises one or more valve controllers adapted to control the first (11) and second (19) valves for refrigerant displacement, which one or more valve controllers are designed to control the operations of at least a first and a second valve set-up, firstly with an open first valve (11) and at the same time a closed second valve (19) or secondly with a closed first valve (11) and at the same time an open second valve (19), characterized in that;

a) the one or more valve controllers comprise an automatic regulator that is designed to activate the first valve set-up, upon:
exceeding a predetermined amount of refrigerant in a refrigerant circuit when at least the first heat exchanger (5) is not currently operating as a condenser or gas cooler with refrigerant flowing through the condenser or gas cooler, or upon:
exceeding a predetermined refrigerant pressure behind the compressor (3) in the refrigerant circuit when at least the first heat exchanger (5) is not currently operating as a condenser or gas cooler with refrigerant flowing through the condenser or gas cooler;

b) a third heat exchanger (63, 67) behind a third expansion element (61, 65).

20. The refrigeration installation system (51) of claim 19 wherein:

a) the refrigerant line at or behind the condenser or gas cooler outlet (17) of the first heat exchanger (5) and in front of the second valve (19) comprises a junction to a further valve (53), which is provided in the refrigerant line in front of or at an evaporator inlet of the first heat exchanger (5);

b) that the further valve (53) or a second further valve (55) comprise expansion elements.

21. A method for operating a refrigeration installation (1) with at least one compressor (3), at least two expansion elements and at least one first (5) and a second (7) heat exchanger, each of which can be operated as a condenser or gas cooler, and at least one of the heat exchangers or another heat exchanger can be operated as an evaporator, wherein in a refrigerant line a first valve (11) is provided behind the at least one compressor (3) at or behind a junction (9) and in front of or at a condenser or gas cooler inlet (15) of the first heat exchanger (5) and in front of a first expansion element (25) of the at least two expansion elements and wherein a second valve (19) is provided at or behind a condenser or gas cooler outlet (17) of the first heat exchanger (5) and in front of or as part of the first expansion element (25), wherein the refrigeration installation (1) also comprises one or more valve controllers adapted to control the first (11) and second (19) valves for refrigerant displacement, which one or more valve controllers are designed to control the operations of at least a first and a second valve set-up, comprising the steps of:

a) firstly opening the first valve (11) and at the same time closing the second valve (19) or secondly closing the first valve (11) and at the same time opening the second valve (19), with at least one of the at least first and second heat exchangers (5, 7) operable as condensers or gas coolers comprising a condenser or gas cooler area (16, 34);

b) regulating the one or more valve controllers such that, if necessary, the refrigerant is held or collected in the condenser or gas cooler area (16) of the first heat exchanger (5) when the first valve set-up is switched on (110) and such that any refrigerant present in the condenser or gas cooler area (16) of the first heat exchanger (5) is introduced into a refrigerant circuit currently in operation when the second valve set-up is switched on (110A).

22. The method according to claim 21, wherein in the refrigerant line a third valve (31) is provided at or behind the junction (9) in a branching area (23) and in front of or at a condenser or gas cooler inlet of the second heat exchanger (7) and wherein a fourth valve (37) is provided at or behind a condenser or gas cooler outlet of the second heat exchanger (7) and in front of or as part of a second expansion element (39) of the at least two expansion elements, characterized in that the one or more valve controllers are further adapted to control the third (31) and fourth (37) valves, which one or more valve controllers are designed to control the operations of at least a first and a second valve set-up for the third (31) and fourth (37) valves, firstly with an open third valve (31) and at the same time a closed fourth valve (37) or secondly with a closed third valve (31) and at the same time a closed fourth valve (37), further comprising the step of regulating the one or more valve controllers such that, if necessary, the refrigerant is held or collected in the condenser or gas cooler area (34) of the second heat exchanger (7) when the first valve set-up for the third (31) and fourth (37) valves is switched on and such that any refrigerant present in the condenser or gas cooler area (34) of the second heat exchanger (7) is introduced into the refrigerant circulation operated by the condenser or gas cooler area (16) of the first heat exchanger (5) when the second valve set-up for the third (31) and fourth (37) valves is switched on.

23. A method according to claim 21 comprising the steps,
    a) of recognizing (100) an amount of refrigerant in the currently flowing refrigerant circulation that has fallen below a predetermined amount of refrigerant,
    b) of adjusting (110) the second valve set-up for any heat exchanger (5, 7) which is not currently operating as a condenser or gas cooler with refrigerant flowing through the condenser or gas cooler.

24. A method according to claim 21 comprising the steps,
    a) of recognizing (100) a refrigerant pressure behind the compressor (3) in the currently flowing refrigerant circulation that has fallen below a predetermined refrigerant pressure,
    b) of adjusting (110) the second valve set-up for any heat exchanger (5, 7) which is not currently operating as a condenser or gas cooler with refrigerant flowing through the condenser or gas cooler.

25. A method according to claim 21 wherein in the refrigerant line a third valve (31) is provided at or behind the junction (9) in a branching area (23) and in front of or at a condenser or gas cooler inlet of the second heat exchanger (7) and wherein a fourth valve (37) is provided at or behind a condenser or gas cooler outlet of the second heat exchanger (7) and in front of an expansion element (39) of the at least two expansion elements or as one of the at least two expansion elements, characterized in that the one or more valve controllers are adapted to control the operations of at least a first and a second valve set-up of the third (31) and fourth (37) valves, firstly with an open third valve (31) and at the same time a closed fourth valve (37) or secondly with a closed third valve (31) and at the same time a closed fourth valve (37), comprising the step of regulating the first valve (11) and second valve (19) or the third (31) and fourth (37) valves such that in a third valve set-up for the first valve (11) and second valve (19) the first heat exchanger (5) is operated as a condenser or gas cooler with open first (11) and at the same time open second (19) valves or, in a third valve set-up for the third (31) and fourth (37) valve the second heat exchanger (7) is operated as a condenser or gas cooler with open third (31) and at the same time open fourth (37) valve.

26. A method according to claim 21, wherein in the refrigerant line a third valve (31) is provided at or behind the junction (9) in a branching area (23) and in front of or at a condenser or gas cooler inlet of the second heat exchanger (7) and wherein a fourth valve (37) is provided at or behind a condenser or gas cooler outlet of the second heat exchanger (7) and in front of an expansion element (39) of the at least two expansion elements or as one of the at least two expansion elements, characterized in that the one or more valve controllers are adapted to control the operations of at least a first and a second valve set-up for the third (31) and fourth (37) valves, firstly for the third (31) and fourth (37) valves, an open third valve (31) and at the same time a closed fourth valve (37) or secondly with a closed third valve (31) and at the same time a closed fourth valve (37), comprising the steps:
    a) of switching on (210A) the third valve set-up for the third (31) and fourth (37) valves,
    b) of operating the first heat exchanger (5), designed as a switchable heat exchanger, as an evaporator in the refrigerant circulation flowing through the second heat exchanger (7) operating as a condenser or gas cooler.

27. A method according to claim 21, wherein the one or more valve controllers are adapted to to control a switch of a third valve set-up with an open first valve (11) and at the same time an open second valve (19) comprising the steps:
    a) of switching on (210) the third valve set-up for the first (11) and second (19) valves,
    b) of operating the second heat exchanger (7), designed as a switchable heat exchanger, as an evaporator in the refrigerant circulation flowing through the first heat exchanger (5) operating as a condenser or gas cooler.

28. A method according to claim 21 comprising the steps,
    a) of recognizing (100) a refrigerant pressure in front of or at the either closed first valve (11) or closed third valve (31) that exceeds a predetermined refrigerant pressure,
    b) of adjusting (110A) the first valve set-up at the either previously closed first valve (11) or, the previously closed third valve (31).

29. A method according to claim 21 comprising the steps,
    a) of recognizing (100) an amount of refrigerant in the refrigerant circulation that exceeds a predetermined amount of refrigerant,
    b) of adjusting (110A) the first valve set-up at the either previously closed first valve (11) or at the previously closed third valve (31).

30. A method according to claim 21 comprising the alternative with the steps
    a) of switching on (245A) the valve set-up with closed first (11) and closed second (19) valves,
    b) of activating (245A) the opening of the further valve (53) provided in a refrigerant line branching off at or behind the condenser or gas cooler outlet (17) of the first heat exchanger (5) and in front of the second valve (19) and provided in front of or at an evaporator inlet of the first heat exchanger (5) designed as a switchable heat exchanger.

31. A method according to claim 21, wherein in the refrigerant line a third valve (31) is provided at or behind the junction (9) in a branching area (23) and in front of or at a condenser or gas cooler inlet of the second heat exchanger (7) and wherein a fourth valve (37) is provided at or behind a condenser or gas cooler outlet of the second heat exchanger (7) and in front of an expansion element (39) of the at least two expansion elements or as one of the at least two expansion elements, characterized in that the refrigeration installation (1) wherein the one or more control valves are adapted to control the third (31) and fourth (37) valves, which valve controller is designed to control the operations of at least a first and a second valve set-up for the third (31) and fourth (37) valves, firstly with an open third valve (31) and at the same time a closed fourth valve (37) or secondly with a closed third valve (31) and at the same time a closed fourth valve (37), comprising the steps,
    a) of switching on (245) the valve set-up with closed third (31) and closed fourth (37) valves, b) of activating (245) the opening of the further valve (55) provided in a refrigerant line branching off at or behind the condenser or gas cooler outlet of the second heat exchanger (7) and in front of the fourth valve (37) and provided in front of or at an evaporator inlet of the second heat exchanger (7) designed as a switchable heat exchanger.

\* \* \* \* \*